(12) United States Patent
Dergham et al.

(10) Patent No.: US 10,018,802 B1
(45) Date of Patent: Jul. 10, 2018

(54) COOLING A DIGITAL MICROMIRROR DEVICE

(71) Applicant: Xerox Corporation, Norwalk, CT (US)

(72) Inventors: Ali Rafic Dergham, Fairport, NY (US); Mark A. Adiletta, Fairport, NY (US); Christopher Douglas Atwood, Rochester, NY (US); Roger Leighton, Hilton, NY (US); Francisco Zirilli, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/450,745

(22) Filed: Mar. 6, 2017

(51) Int. Cl.
*G02B 7/18* (2006.01)
*G02B 26/08* (2006.01)

(52) U.S. Cl.
CPC ....... *G02B 7/1815* (2013.01); *G02B 26/0833* (2013.01)

(58) Field of Classification Search
CPC ........ G02B 7/18; G02B 26/08; H05K 1/0201; H05K 7/20; H02B 1/56; H01L 23/34; H01L 23/467
USPC .................... 359/845; 361/676, 677; 353/54; 352/202
See application file for complete search history.

(56) References Cited

U.S. PATENT DOCUMENTS

| | | | | |
|---|---|---|---|---|
| 2002/0163625 A1* | 11/2002 | Tabuchi | ................ | G02B 5/003 353/31 |
| 2006/0197917 A1* | 9/2006 | Zakoji | .................... | G03B 21/16 353/54 |
| 2007/0206158 A1* | 9/2007 | Kinoshita | ............. | G03B 21/16 353/52 |
| 2007/0247592 A1* | 10/2007 | Lin | ........................ | G03B 21/16 353/54 |
| 2010/0328619 A1* | 12/2010 | Harland | ................ | G03B 21/16 353/54 |
| 2015/0049374 A1* | 2/2015 | Hofmann | ............. | G02B 7/1815 359/213.1 |
| 2015/0092287 A1* | 4/2015 | Nishio | ............... | G02B 26/0825 359/845 |

* cited by examiner

*Primary Examiner* — Frank Font (57) ABSTRACT

An apparatus and a method for cooling a digital micromirror device are disclosed. For example, the apparatus includes a digital micromirror device (DMD), a socket coupled to the DMD and a spray cooling block coupled to the socket to form an enclosed volume with a surface of the DMD. The spray cooling block includes a first plurality of openings to spray liquid droplets onto the surface of the DMD and a second plurality of openings to collect effluent into an effluent collection volume.

20 Claims, 8 Drawing Sheets

COOLING A DIGITAL MICROMIRROR DEVICE

The present disclosure relates generally to printers and optical components within certain laser imaging modules and, more particularly, to an apparatus and method for cooling a digital micromirror device.

BACKGROUND

Some printers or imaging devices use a laser imaging module (LIM). The LIM may include one or more lasers that work with one or more optical components to re-direct the laser to a print medium to print an image. During operation, the optical components can generate a large amount of heat due to the amount of power used by the lasers within the LIM.

Large amounts of heat can negatively affect the optical components. For example, large amounts of heat can cause the optical components to operate improperly, operate with a reduced life expectancy, or in extreme instances, cause the optical components to completely fail. Currently used methods may be inefficient in cooling the optical components to a proper temperature range.

SUMMARY

According to aspects illustrated herein, there are provided an apparatus and a method for cooling a digital micromirror device. One disclosed feature of the embodiments is a laser imaging module that comprises a digital micromirror device (DMD), a socket coupled to the DMD and a spray cooling block coupled to the socket to form an enclosed volume with a surface of the DMD. The spray cooling block includes a first plurality of openings to spray liquid droplets onto the surface of the DMD and a second plurality of openings to collect effluent into an effluent collection volume.

Another disclosed feature of the embodiments is a method for cooling the DMD. In one embodiment, the method comprises measuring a temperature of the DMD, determining that the temperature of the DMD is above a threshold and providing a liquid through a spray cooling block comprising a first plurality of openings to spray liquid droplets onto a surface of the DMD within an enclosed volume formed by the spray cooling block, a socket and the surface of the DMD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for cooling a digital micromirror device (DMD). As discussed above, some printers or imaging devices use a laser imaging module (LIM). The LIM may include one or more lasers that work with one or more optical components to re-direct the laser to a print medium to print an image. During operation, the optical components can generate a large amount of heat due to the amount of power used by the lasers within the LIM.

Large amounts of heat can negatively affect the optical components. For example, large amounts of heat can cause the optical components to operate improperly, operate with a reduced life expectancy, or in extreme instances, cause the optical components to completely fail. Currently used methods may be inefficient in cooling the optical components to a proper temperature range.

A DMD presents further challenges to properly cool the DMD due to high heat fluxes involved. Due to how the DMD is mounted on an electrical board, the amount of space available for effective cooling is very limited.

Embodiments of the present disclosure provide a novel apparatus and method that provides a higher heat transfer rate in a spray cooling block than previous designs. In addition, some embodiments may increase the surface area that is available to be cooled to further increase the heat transfer rate and provide more efficient cooling of the DMD.

Figure 1:
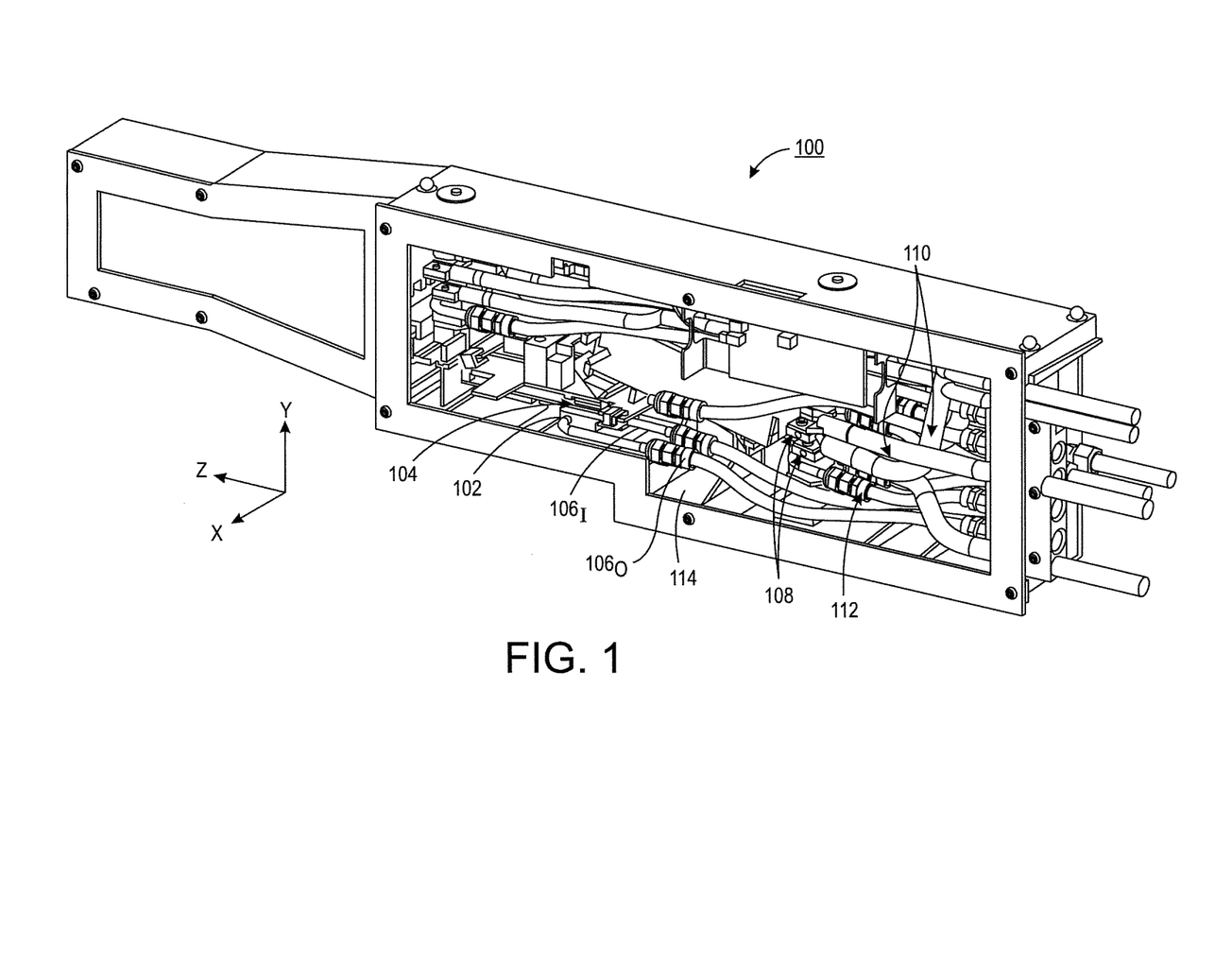
FIG. 1 illustrates an example laser imaging module (LIM) of the present disclosure within a laser imaging module.

FIG. 1 illustrates an example laser imaging module (LIM) or apparatus 100 of the present disclosure. In one embodiment, the LIM 100 may be part of an imaging device or printer. In one embodiment, the LIM 100 may include one or more laser diodes 108 that emit lasers that are redirected by a digital micromirror device (DMD) 104 onto a print medium (e.g., paper, plastic, fabric, and the like). The laser diodes 108 may be connected to a processor, a power source, and the like via one or more electrical connections 110.

In one embodiment, the laser diodes 108 may be powered by a large amount of power. For example, the laser diodes 108 may be powered by as much as 360 Watts of energy and can generate large amounts of heat. In one embodiment, the laser diodes 108 may be cooled by one or more cooling lines 112.

In one embodiment, the DMD 104 may comprise arrays of small mirrors that are used to redirect the laser, or light, emitted by the laser diodes 108. During operation the large amount of energy of the light emitted by the laser diodes 108 can cause the DMD 104 to rise in temperature. High temperatures can cause damage to the DMD 104 or complete failure. For example, temperatures above 70 degrees Celsius (° C.) can cause the life of the DMD 104 to degrade. Temperatures above 120° C. can cause damage to the DMD 104 or cause the DMD 104 to fail.

As noted above, the DMD 104 may present challenges to properly cool the DMD 104 due to high heat fluxes involved. The amount of space available for effective cooling is very limited due to how the DMD 104 is mounted to the electrical board.

One embodiment of the present disclosure provides a spray cooling block 102 that is designed to efficiently cool the DMD 104. The spray cooling block 102 may use a coolant that is moved through the spray cooling block 102 via an inlet cooling line 106$_I$ and an outlet cooling line 106$_o$. The inlet cooling line 106$_I$ and the outlet cooling line 106$_o$ may also be referred to herein collectively as cooling line or lines 106.

In one embodiment, the spray cooling block 102 and the cooling lines 106 may comprise a metal. For example, the spray cooling block 102 and the cooling lines 106 may be fabricated from copper or another similar conductive metal.

In one embodiment, the coolant may be any type of liquid that transfers heat away from the DMD 104. One example of a coolant that may be used is a mixture of water and ethylene glycol. Another example of a coolant that may be used is a fluorocarbon-based fluid. Examples of such fluorocarbon-based fluids are perflurohexane and perfluoro (2-butyl-tetrahydrofurane), which are known by the tradename of Fluorinert®.

In one embodiment, a heat sensing device 114 may be coupled, directly or indirectly, to spray cooling block 102 and/or the DMD 104. The heat sensing device 114 may be a thermistor wire, a thermocouple, or any other type of heat sensing device.

The heat sensing device 114 may measure the temperature of the DMD 104. Based on the temperature, a processor or controller, may release, or move, the coolant through the cooling line 106 and the spray cooling block 102. For example, when the temperature measured by the thermistor wire 114 rises above a temperature threshold (e.g., 70° C., 120° C., and the like), the coolant may be moved through the spray cooling block 102 to lower, and maintain, the temperature back below the threshold temperature. In another example, the heat sensing device 114 may be used to send feedback to the processor or controller such that the processor could send a command to a chiller and change an inlet coolant temperature.

Figure 2:
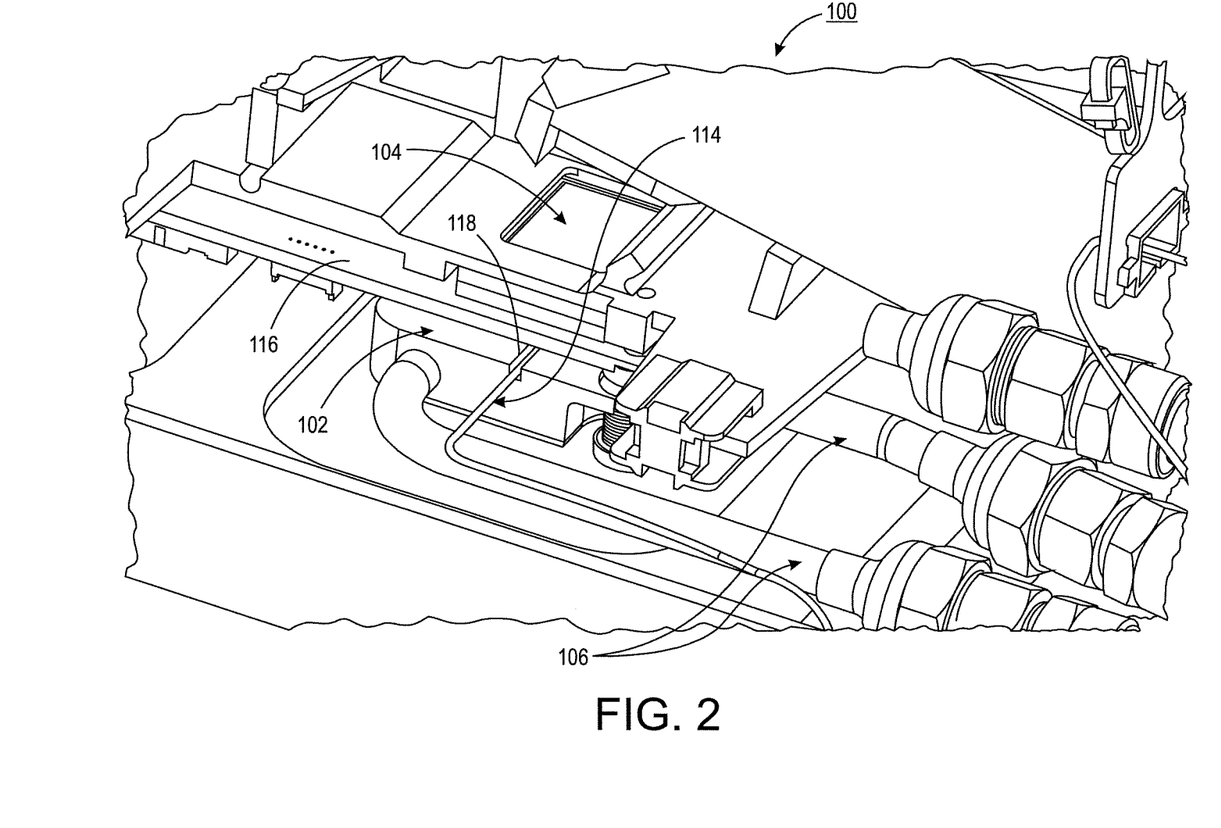
FIG. 2 illustrates a close-up view of an example spray cooling block within the LIM of the present disclosure.

FIG. 2 illustrates a more detailed view of the spray cooling block 102 and how it is positioned within the LIM 100. Some components from FIG. 1 have been removed in FIG. 2 to show in greater detail how the DMD 104 is positioned on an electrical board 116 and on the spray cooling block 102. In one embodiment, the spray cooling block 102 may include a cut out or groove 118 that holds the heat sensing device 114.

Although the cooling lines 106 are shown as being run laterally or horizontally into the spray cooling block 102, it should be noted that the cooling lines 106 may be run vertically into the spray cooling block 102. For example, the cooling lines 106 may be located below the spray cooling block 102 and enter from a bottom side of the spray cooling block 102 rather than the lateral sides of the spray cooling block 102. Running the cooling lines 106 vertically may help remove some turns that may help reduce the overall pressure drop within the cooling lines 106. Overall, removing as many turns as possible may help reduce the overall pressure drop within the cooling lines 106 whether the cooling lines 106 are run horizontally or vertically into the spray cooling block 102. In addition, the cooling lines 106 may be able to deliver, or move, the coolant through the spray cooling block 102 at a greater velocity, or with more turbulent flow.

Figure 3:
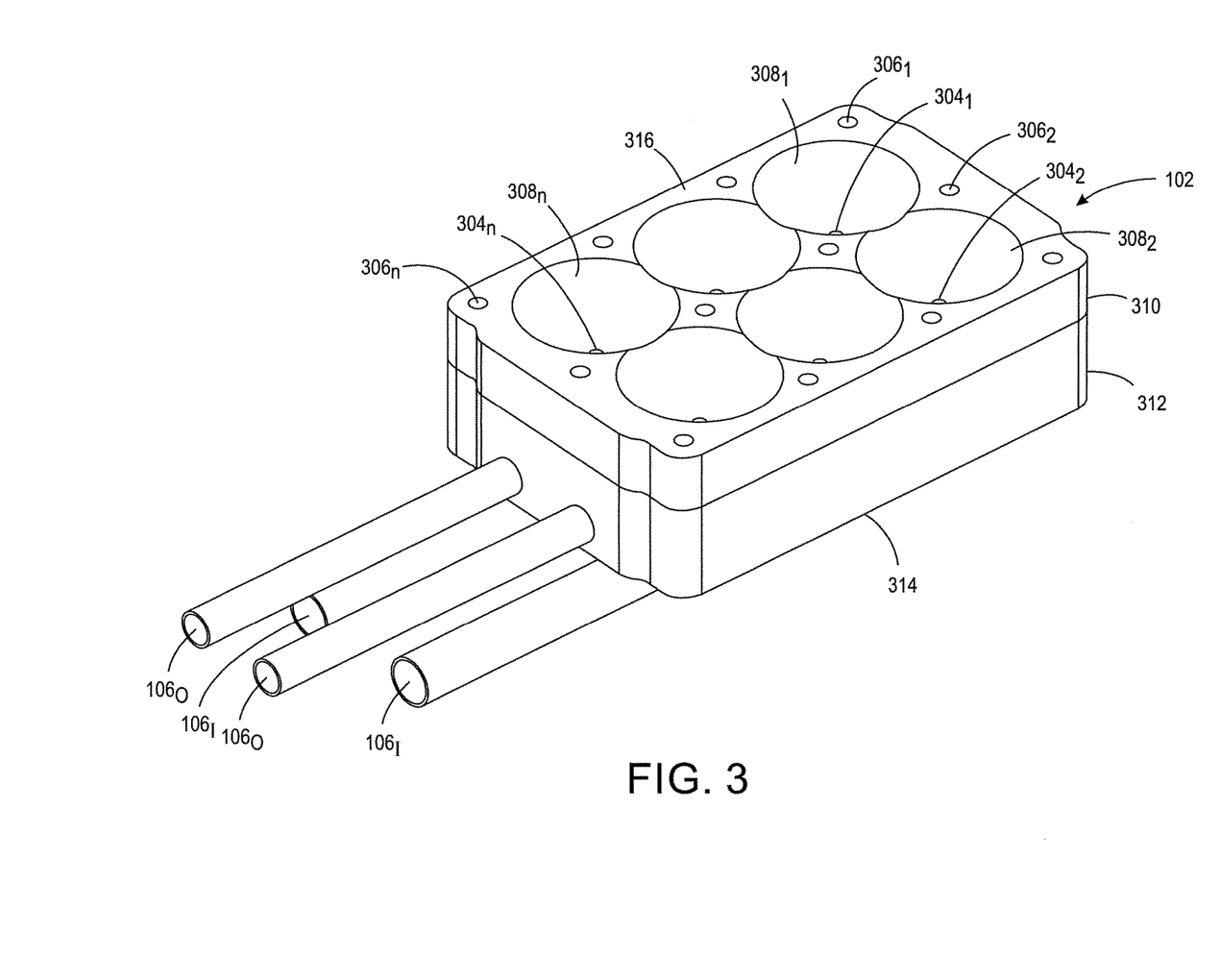
FIG. 3 illustrates an isometric view of an example spray cooling block of the present disclosure.

FIG. 3 illustrates an isometric view of the spray cooling block 102. In one embodiment, the spray cooling block 102 may include a plurality of openings 304$_1$ to 304$_n$ (hereinafter referred to individually as an opening 304 or collectively as openings 304) and a plurality of openings 306$_1$ to 306$_n$ (hereinafter referred to individually as an opening 306 or collectively as openings 306) on a top side 316. It should be noted that the number of openings 304 and 306 may vary depending on a size and application of the spray cooling block 102. Thus, the number of openings 304 and 306 illustrated in FIG. 3 should not be considered limiting.

It should also be noted that the openings 304 may be referred to as a "first" opening 304 and that the opening 306 may be referred to as a "second" opening 306. The labels "first" and "second" are used as labels to differentiate the different openings 304 and 306 and do not connote an order or sequence.

In one embodiment, the openings 304 may also include a respective conic opening 308$_1$ to 308$_n$ (hereinafter referred to individually as a conic opening 308 or collectively as conic openings 308). The conic openings 308 may be other similar shapes, such as, a circular shape, an oval shape, and the like.

In one embodiment, liquid may be provided via the inlet cooling lines 106$_I$. The liquid may be fed from a bottom side 314 of the spray cooling block 102. The liquid may be fed under pressure (e.g., via an inert gas) to create a turbulent flow out through the openings 304 and the conic opening 308 towards a surface of the DMD 104 that is to be cooled. In another embodiment, the turbulent flow may be created by the sudden pressure drop from the small diameter opening of the openings 304 to the much wider diameter opening of the conic openings 308.

In one embodiment, the turbulent flow of the liquid being fed out of the openings 304 may create liquid droplets to be sprayed towards the surface of the DMD 104 that is to be cooled. As will be discussed in further detail below, the liquid droplets may create many different heat transfer mechanisms to occur that cool the surface of the DMD 104. One heat transfer mechanism is the evaporation of the liquid droplets and condensation of the evaporated liquid droplets to create an effluent. The effluent may fall into the openings 306 and be carried out of the spray cooling block 102 via the outlet cooling lines 106$o$.

In one embodiment, the spray cooling block 102 may be formed from two different pieces. For example, a first half 310 and a second half 312 may be combined to form the spray cooling block 102. The spray cooling block 102 may be fabricated from a metal. For example, the spray cooling block 102 may comprise a conductive metal such as copper or another similar conductive metal, as noted above.

Figure 4:
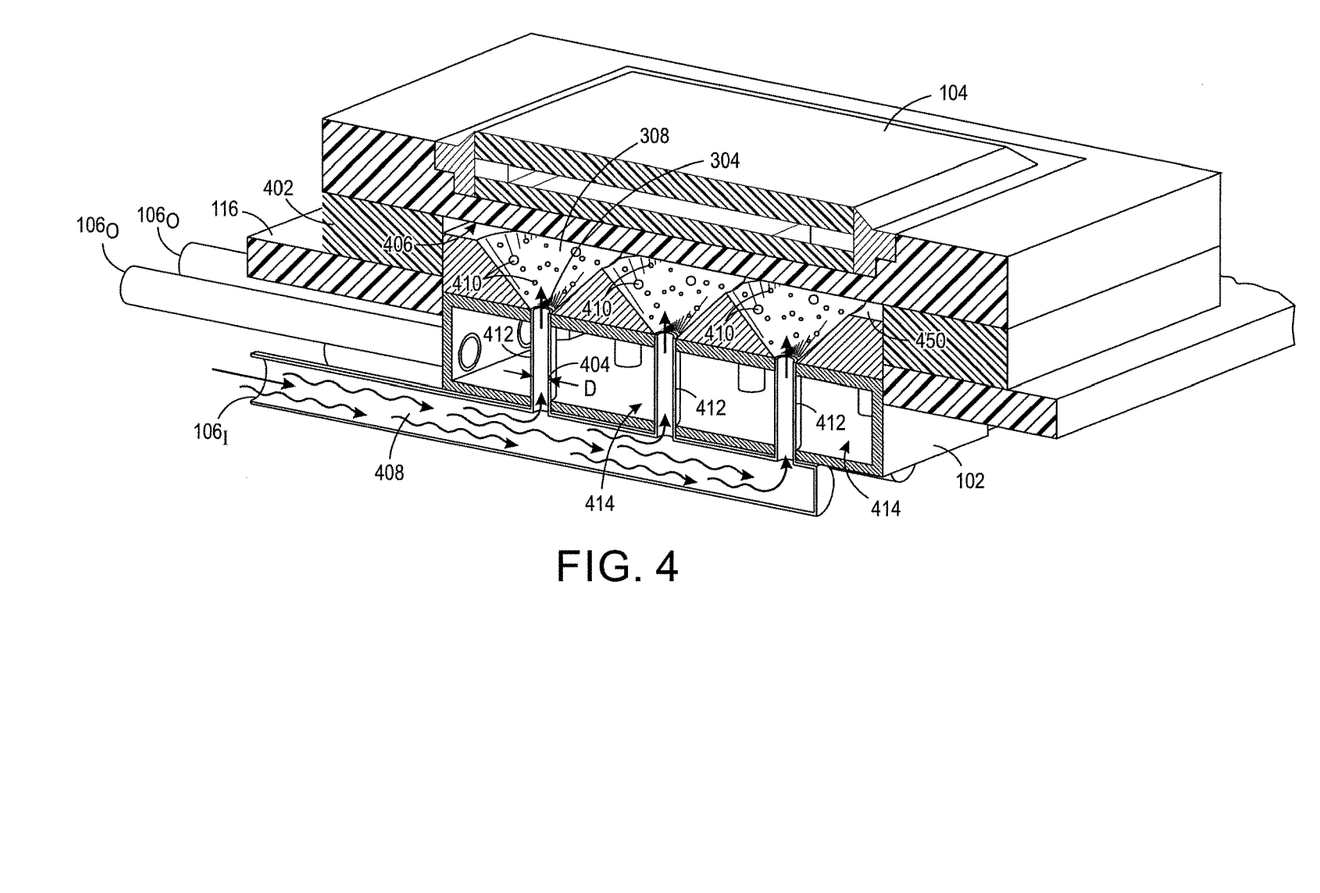
FIG. 4 illustrates a cross-sectional view of the example spray cooling block of the present disclosure.

FIG. 4 illustrates a cross sectional view of the example spray cooling block 102 coupled to the DMD 104. In one embodiment, a socket 402 may be coupled to a bottom side 406 of the DMD 104. In addition, the electrical board 116 (e.g., a printed circuit board) may also be coupled to the socket 402. In one embodiment, the spray cooling block 102 may be coupled to the socket 402 to create an enclosed volume 450. The enclosed volume 450 may be created by the top surface 316 of the spray cooling block 102, the socket 402 and the bottom surface 406 of the DMD 104. In other words, the socket 402 may form the lateral walls of the enclosed volume 405, while the top surface 316 of the spray cooling block 102 and the bottom surface 406 of the DMD 104 form the bottom and top, respectively. In one embodiment, a distance between the top surface 316 of the spray cooling block 102 and the bottom surface 406 of the DMD 104 may be approximately 0.35 millimeters (mm) to 0.65 mm.

In one embodiment, a liquid 408 may be fed through the inlet cooling line 106$_I$. The liquid 408 may be fed under pressure through a plurality of vertical pipes 412 from the bottom side 314 of the spray cooling box 102. The number of vertical pipes 412 may be equal to the number of openings 304 and the conic openings 308. The vertical pipes 412 may run up through an effluent collection volume 414. The liquid 408 may be forced upward through the vertical pipes 412 under pressure causing a turbulent flow. The turbulent flow may cause the liquid 408 to be sprayed out of the openings 304 and the conic openings 308 as liquid droplets 410. The liquid droplets 410 may be sprayed against the bottom side 406 of the DMD 104.

In one embodiment, the vertical pipes 412 may have a diameter of approximately 1.0 mm to 3.2 mm. The diameter (D) of the vertical pipes 412 may be measured as shown by a line 404. In one embodiment, the diameter of each one of the vertical pipes 412 may be approximately the same. In one embodiment, the liquid droplets may have a diameter of approximately 15 microns (µm) to 500 µm.

As will be discussed in further detail below in FIG. 6, the liquid droplets 410 may be sprayed against the bottom surface 406 of the DMD 104 to create a thin two-phase film. The two-phase film may be in a liquid and gas phase as the liquid droplets 410 continually wet the bottom surface 406 and evaporate due to the heat flux of the DMD 104 towards the bottom surface 406. Other cooling mechanisms may occur as discussed in further detail below in FIG. 6 to improve the cooling efficiency of the spray cooling block 102.

Figure 5:
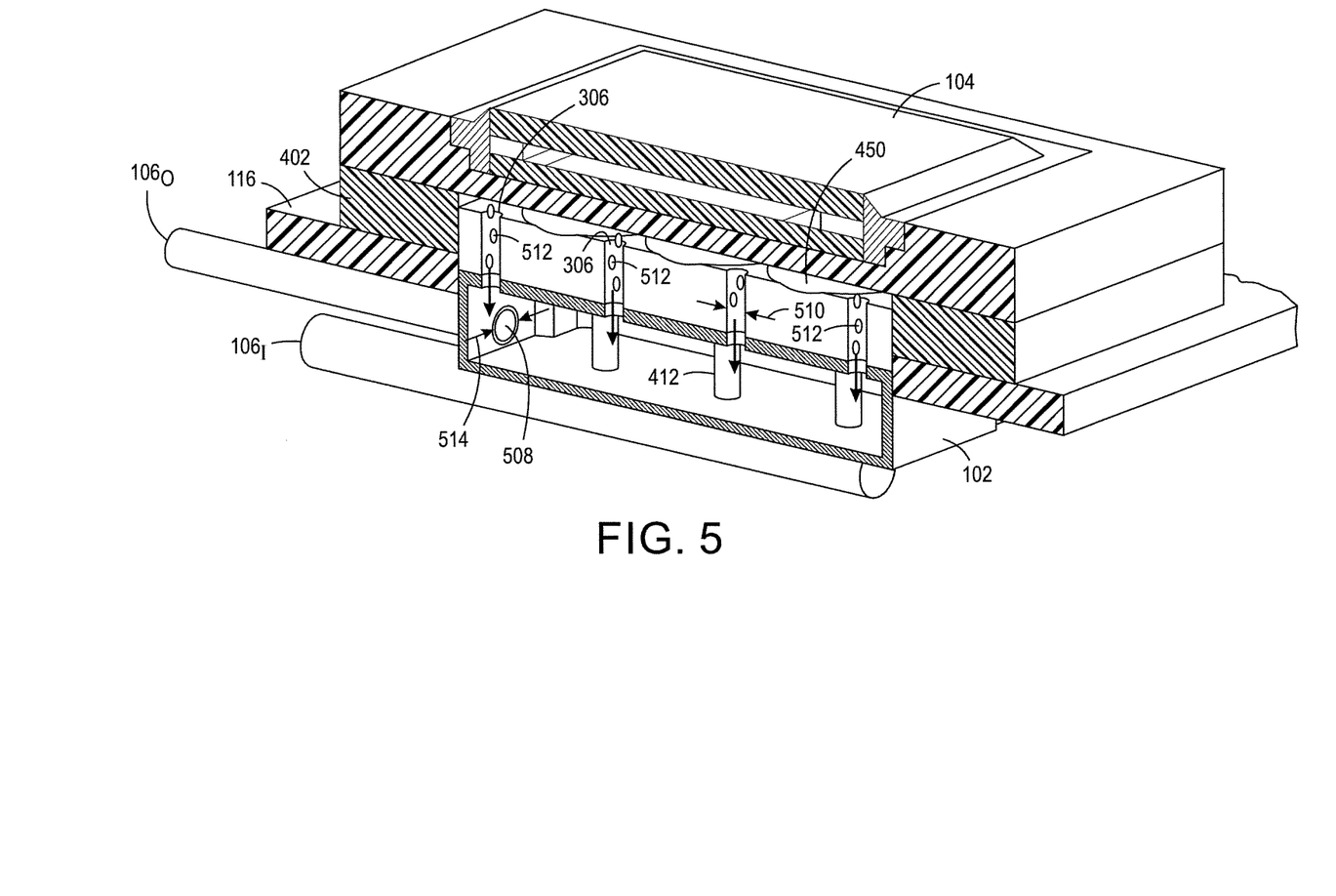
FIG. 5 illustrates another cross-sectional view the example spray cooling block of the present disclosure.

FIG. 5 illustrates another cross sectional view of the example spray cooling block 102 coupled to the DMD 104. FIG. 5 illustrates effluent 512 that falls into the openings 306. The effluent 512 may be the condensation of the evaporated liquid droplets 410 illustrated in FIG. 4. As noted above, one of the cooling mechanisms of the spray cooling box 102 may be that the liquid droplets 410 may evaporate from the two-phase film that continually wets the bottom side 406 of the DMD 104 into the effluent 512. The effluent 512 may fall through the openings 306 into the effluent collection volume 414. The effluent 512 may then be carried out by the outlet cooling lines 106o by one or more exit openings 508 near a bottom portion of a wall of the spray cooling box 102.

In one embodiment, the openings 306 may have a diameter of approximately 0.25 mm to 1.0 mm. The diameter of the openings 306 may be measured as shown by line 510. In one embodiment, the one or more exit openings 508 may have a diameter of approximately 5 mm to 7.5 mm. The diameter of the one or more exit openings 508 may be measured as shown by line 514.

In one embodiment, the liquid 408 may have a flow rate of approximately 0.5 liters per minute (lpm) to 1.0 lpm. The liquid 408 may be delivered at a temperature of approximately 30 degrees ° C. In one embodiment, when the liquid 408 is provided at approximately 0.8 lpm at 30° C., a maximum heat flux of 72 watts per square centimeter ($W/cm^2$).

In another embodiment, the bottom side 406 of the DMD 104 may include a surface enhancement to improve the cooling efficiency. For example, the surface enhancement may be an uneven surface on the bottom side 406 of the DMD 104 to increase the cooling surface area. In one embodiment, the uneven surface may be a plurality of surface members or a rough surface. The plurality of surface members may be a plurality of cylindrical pins that protrude from the bottom side 406 of the DMD 104 into the enclosed volume 450 towards the top side 316 of the spray cooling box 102. The plurality of surface members may include a plurality of fins that protrude from the bottom side 406 of the DMD 104 into the enclosed volume 450 towards the top side 316 of the spray cooling box 102. The plurality of fins may be arranged as rectangular straight fins across the bottom side 406 of the DMD 104 or may be arranged radially outward as triangular fins around the bottom side 406 of the DMD 104. The plurality of surface members may include a plurality of cubic pins that protrude from the bottom side 406 of the DMD 104 into the enclosed volume 450 towards the top side 316 of the spray cooling box 102. The plurality of surface members may be a plurality of holes created into the bottom side 406 of the DMD 104. Other shapes, geometries, and arrangements that increase the overall surface area of the bottom side 406 of the DMD 104 may be deployed.

In one embodiment, when the bottom side 406 of the DMD 104 includes a surface enhancement the liquid 408 may be delivered at a flow rate of approximately 0.4 lpm. At a flow rate of approximately 0.4 lpm and at a temperature of approximately 30° C., a maximum heat flux of 130 $W/cm^2$ can be achieved using a rectangular straight fin surface enhancement. Thus, the surface enhancement can greatly improve the cooling efficiency of the spray cooling box 102.

Figure 6:
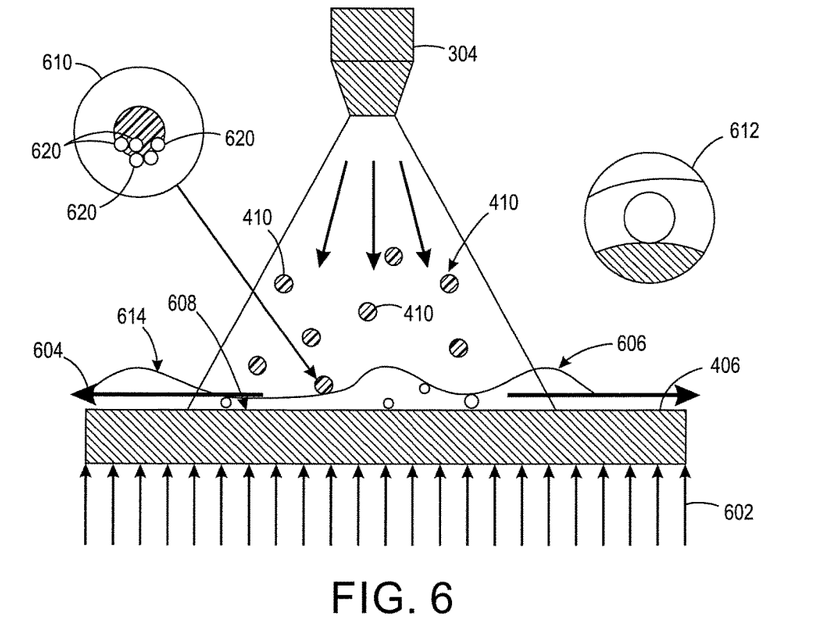
FIG. 6 illustrates an example of the spray cooling mechanisms of the present disclosure.

FIG. 6 illustrates an example of the spray cooling of the present disclosure. As discussed above, the spray cooling box 102 may cool the DMD 104 using a variety of different cooling mechanism. FIG. 6 illustrates a top down view of example cooling mechanisms that occur on the bottom side 406 of the DMD 104.

In one embodiment, heat may be generated by the DMD 104 and the heat may move towards the bottom side 406 as shown by arrows 602. The openings 304 (shown as a nozzle in FIG. 6 for simplification) sprays liquid droplets 410 towards the bottom side 406. As discussed, above, the openings 304 and the cylindrical openings 308 may be sized to create a spray of the liquid droplets 410 at diameter of approximately 15 to 500 µm.

The liquid droplets 410 may form a two phase film 606 against the bottom side 406 of the DMD 104 that continually wets the bottom side 406. The two phases of the two phase film 606 may be a liquid phase and gas phase. For example, the liquid droplets 410 hit the bottom side 406 as a liquid continuously. However, the heat flux from the DMD 104 may heat the liquid droplets 410 causing the liquid to boil and evaporate into the effluents 510. Thus, the evaporation provides one cooling mechanism.

In addition, as the liquid droplets 410 impinge, or strike, against the two phase film 606, the impingement creates a forced convection shown by arrows 604. In other words, the impingement of the liquid droplets 410 moves the two-phase liquid film 606 to allow the heat to be carried away from the bottoms side 406 via convection. In addition, the convection may move vapor bubbles created by the boiling of the liquid from the heat flux from the DMD towards a surface of the two-phase film 606.

Another cooling mechanism may be enhancement of nucleation sites in the two-phase film 606. For example, as the liquid boils and creates vapor bubbles, the impingement of the liquid droplets 410 may break-up the bubbles on the fixed nucleation sites of the vapor bubbles. The frequent break-up of the vapor bubbles caused by the liquid droplets 410 may lead to a rapid removal of the vapor bubbles at the fixed nucleation sites and a shorter interval of time for vapor bubble growth from the same fixed nucleation sites. As a result, more vapor bubbles may be allowed to grow and the "reduced vapor bubble" size (e.g., due to the liquid droplets 410 breaking the vapor bubble before a natural pressure within the vapor bubble is able to break the surface tension naturally) allows more vapor bubbles to grow around the fixed nucleation sites at a more rapid rate.

In addition, secondary nucleation sites may be created by small droplets 620, as shown in a close up 610. The small droplets 620 may be created when the vapor bubbles burst or are broken as the liquid droplets 410 impinge the vapor bubbles. The small droplets 620 may be created and entrap vapor around them. The small droplets 620 with the entrapped vapor may fall back towards the vapor bubbles formed by the boiling liquid in the two-phase film 606 and can act as nucleation sites to promote further boiling and heat transfer.

Another cooling mechanism may be transient conduction shown by a close up 612. The transient conduction may come from liquid backfilling of the superheated bottom side 406 of the DMD 104 after vapor bubble departure. For example, cold liquid droplets 410 may impinge the two-phase film 606. The impingement may cause a rebound of cold liquid after impact. The transient conduction may be attributed to spreading the cold liquid over the dry cold surface of the bottom side 406 of the DMD 104.

Thus, FIG. 6 illustrates several cooling mechanisms that occur from liquid droplets 410 that are sprayed onto the bottom side 406 of the DMD 104. It should be noted that cooling mechanisms may also occur that are not discussed herein or illustrated in FIG. 6.

Figure 7:
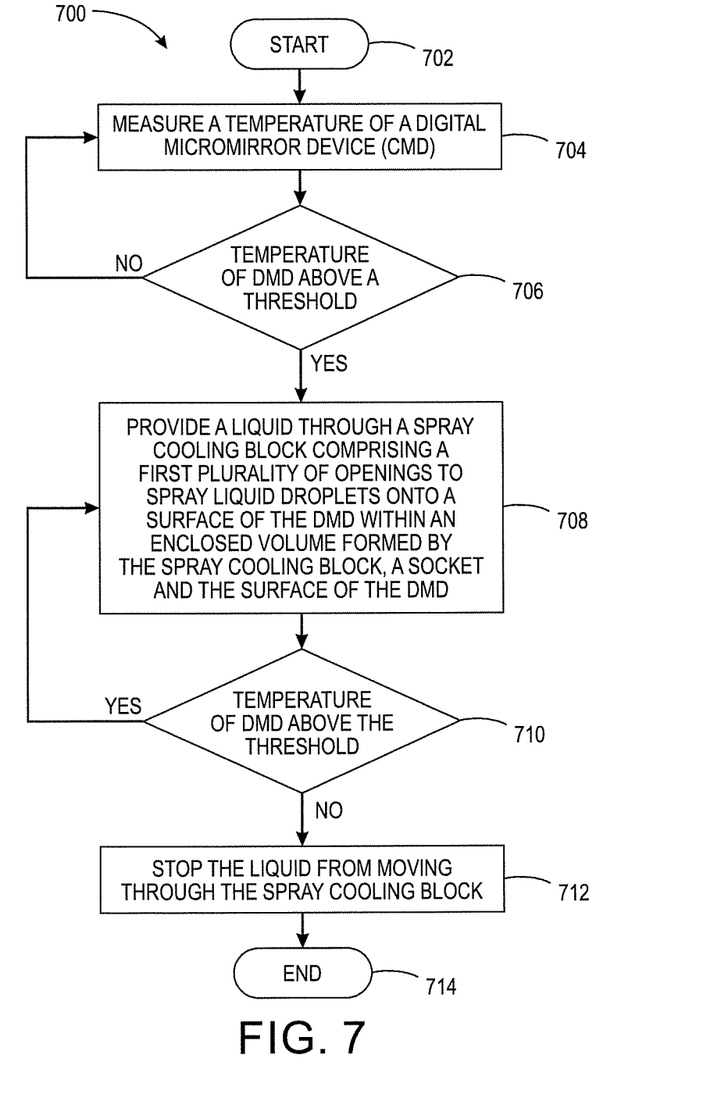
FIG. 7 illustrates a flowchart of an example method for cooling a digital mirror device.
Figure 8:
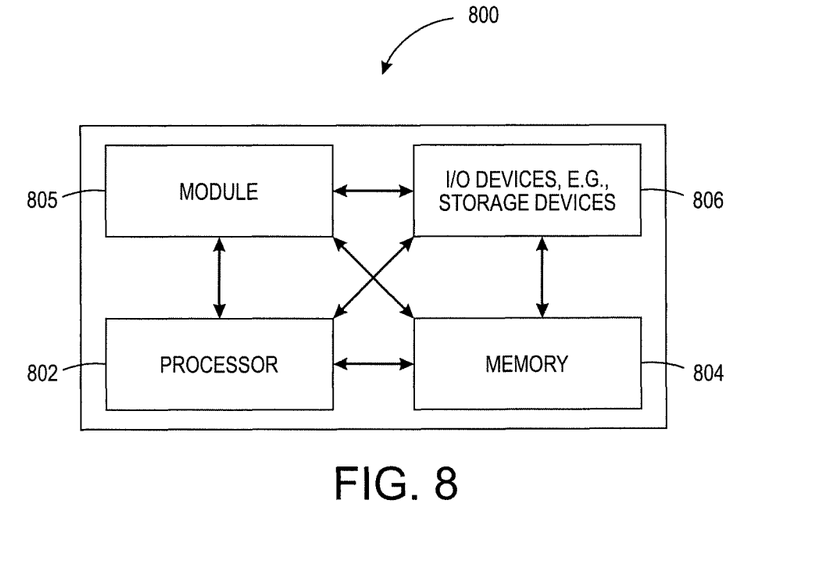
FIG. 8 illustrates a high-level block diagram of a computer suitable for use in performing the functions described herein.

FIG. 7 illustrates a flowchart of an example method 700 for cooling a digital micromirror device. In one embodiment, one or more steps or operations of the method 700 may be performed by the LIM 100 or a computer that controls the LIM 100 as illustrated in FIG. 8 and discussed below.

At block 702, the method 700 begins. At block 704, the method 700 measures a temperature of the DMD. For example, the heat sensing device may measure the temperature of the DMD.

At block 706, the method 700 determines if the temperature of the DMD is above a threshold. For example, the threshold may be a temperature that is associated with degradation of life or failure of the DMD. In one embodiment, the threshold may be 20° C.-30° C. In another embodiment, the threshold may be 70° C.

If the temperature is not above the threshold temperature, the method 700 may return to block 704 and continue monitoring the temperature of the DMD. However, if the temperature is above the threshold temperature, the method 700 may proceed to block 708.

At block 708, the method 700 may provide a liquid through a spray cooling block comprising a first plurality of openings to spray liquid droplets onto a surface of the DMD within an enclosed volume formed by the spray cooling block, a socket and the surface of the DMD. For example, a liquid may be forced through the first plurality of openings under pressure. The liquid may form liquid droplets as the liquid exits the first plurality of openings as a spray. The liquid droplets may contact the surface of the DMD (e.g., a bottom side of the DMD) that is heated by operation of the DMD.

The liquid droplets may form a two-phase film against the surface of the DMD that continually wets the surface. The continuous impingement of the liquid droplets against the two-phase film may cool the DMD using a variety of different cooling mechanisms described above and illustrated in FIG. 6. For example, the impingement of the liquid droplets may increase convection flow, evaporate from a heat flux against the surface of the DMD, enhance nucleation sites of vapor bubbles, and the like.

The liquid droplets and the liquid in the two-phase film may evaporate to form an effluent. The effluent may exit the enclosed volume via a second plurality of openings into an effluent collection volume. The effluent may be moved out of the spray cooling box and recycled in a closed loop.

At optional block 710, the method 700 determines if the temperature of the DMD is above the threshold. For example, the heat sensing device may continue to measure the temperature of the DMD. If the temperature of the DMD remains above the threshold, the method 700 may loop back to block 708 and continue to cool the DMD via the liquid that is delivered through the spray cooling block.

However, if the temperature of the DMD is below the threshold, the method 700 may continue to optional block 712. At optional block 712, the method 700 may stop the liquid from moving through the spray cooling block. At block 714, the method 700 ends.

In one embodiment, the method 700 may loop indefinitely from block 712 back to block 704. In other words, the method 700 may continuously measure the temperature of the DMD and cool the DMD via the liquid moved through the spray cooling block as long as the LIM is operating.

It should be noted that although not explicitly specified, one or more steps, functions, or operations of the method 700 described above may include a storing, displaying and/or outputting step as required for a particular application. In other words, any data, records, fields, and/or intermediate results discussed in the methods can be stored, displayed, and/or outputted to another device as required for a particular application. Furthermore, steps, blocks or operations in FIG. 7 that recite a determining operation or involve a decision do not necessarily require that both branches of the determining operation be practiced. In other words, one of the branches of the determining operation can be deemed as an optional step. In addition, one or more steps, blocks, functions or operations of the above described method 700 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

FIG. 8 depicts a high-level block diagram of a computer that is dedicated to perform the functions described herein. As depicted in FIG. 8, the computer 800 comprises one or more hardware processor elements 802 (e.g., a central processing unit (CPU), a microprocessor, or a multi-core processor), a memory 804, e.g., random access memory (RAM) and/or read only memory (ROM), a module 805 for cooling a digital micromirror device, and various input/output devices 806 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 805 for cooling a digital micromirror device (e.g., a software program comprising computer-executable instructions) can be loaded into memory 804 and executed by hardware processor element 802 to implement the steps, functions or operations as discussed above in connection with the example method 700. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 805 for cooling a digital micromirror device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A laser imaging module (LIM), comprising:
   a digital micromirror device (DMD);
   a socket coupled to the DMD; and
   a spray cooling block coupled to the socket to form an enclosed volume with a surface of the DMD, wherein the spray cooling block comprises:
   a first plurality of openings to spray liquid droplets onto the surface of the DMD; and
   a second plurality of openings to collect effluent into an effluent collection volume.

2. The LIM of claim 1, wherein a diameter of the first plurality of openings comprises approximately 1.0 millimeters (mm) to 3.2 mm.

3. The LIM of claim 1, wherein a diameter of the second plurality of openings comprises approximately 0.25 millimeters (mm) to 1.0 mm.

4. The LIM of claim 1, the first plurality of openings comprising a conic opening.

5. The LIM of claim 4, wherein a liquid is fed under pressure through the first plurality of openings towards the conic opening to form the liquid droplets.

6. The LIM of claim 1, wherein the liquid droplets are have a diameter of approximately 15 to 500 microns.

7. The LIM of claim 1, wherein the liquid droplets comprises a coolant comprising at least one of: a mixture of water and ethylene glycol or Fluorinert.

8. The LIM of claim 1, wherein a side of the surface of the DMD that is internal to the enclosed volume comprises an uneven surface.

9. The LIM of claim 8, wherein the uneven surface comprises at least one of: a plurality of surface members or a rough surface.

10. The LIM of claim 9, wherein the plurality of surface members comprises at least one of: a plurality of pins or a plurality of fins.

11. The LIM of claim 1, wherein a distance between a top surface of the spray cooling block to the surface of the DMD in the enclosed volume comprises approximately 0.35 millimeters (mm) to 0.65 mm.

12. The LIM of claim 1, further comprising:
   a heat sensing device measure a temperature of the DMD.

13. A method for cooling a digital micromirror device (DMD), comprising:
   measuring a temperature of the DMD;
   determining that the temperature of the DMD is above a threshold; and
   providing a liquid through a spray cooling block comprising a first plurality of openings to spray liquid droplets onto a surface of the DMD within an enclosed volume formed by the spray cooling block, a socket and the surface of the DMD.

14. The method of claim 13, wherein the liquid droplets that are sprayed reduces the temperature of the DMD by forming a two phase film on the surface of the DMD within the enclosed volume, impinging against the two phase film to increase convection flow, and evaporating from a heat flux against the surface of the DMD.

15. The method of claim 14, further comprising:
   collecting effluent that evaporates through a second plurality of openings in the spray cooling block; and
   recycling the effluent as the liquid that is provided continuously to the spray cooling block.

16. The method of claim 13, further comprising:
   repeating the measuring until the temperature of the DMD is below the threshold; and
   stopping the liquid from moving through the spray cooling block.

17. The method of claim 13, wherein the temperature is measured by a heat sensing device coupled to the DMD and the spray cooling block.

18. The method of claim 13, wherein the liquid comprises a coolant comprising at least one of: a mixture of water and ethylene glycol or Fluorinert.

19. A laser imaging module (LIM), comprising:
   a digital micromirror device (DMD);

a socket coupled to the DMD;

a cooling loop that delivers a liquid, wherein the cooling loop comprises an inlet cooling line and an outlet cooling line; and a spray cooling block coupled the socket to form an enclosed volume with a surface of the DMD, wherein the spray cooling block comprises:

a first plurality of openings to receive the liquid from the inlet cooling line of the cooling loop, wherein the liquid is forced up from a bottom side of the spray cooling block under pressure and out a top side of the spray cooling block to spray liquid droplets having a diameter of approximately 15 to 500 microns onto the surface of the DMD; and a second plurality of openings to collect effluent that are evaporated from a heat transfer against the surface of the DMD into an effluent collection volume, wherein the effluent is moved through the outlet cooling line of the cooling loop and recycled as the liquid.

20. The LIM of claim 19, further comprising:

a thermoelectric cooling device coupled to the spray cooling block.

\* \* \* \* \*